United States Patent [19]

Struck

[11] 3,743,915
[45] July 3, 1973

[54] BATTERY POWERED IMPLEMENT AND CIRCUIT CONTROL THEREFOR

[76] Inventor: Charles R. Struck, 125 Arboleda Road, Santa Barbara, Calif. 93110

[22] Filed: Sept. 8, 1972

[21] Appl. No.: 287,565

[52] U.S. Cl. .................. 320/2, 200/60, 200/155 R
[51] Int. Cl. ...................... H01m 45/00, F21l 7/00
[58] Field of Search .............. 240/10.6 R, 10.61, 240/10.63, 10.66, 10.67, 10.68; 320/2; 200/155, 171, 172, 60; 310/50

[56] References Cited
UNITED STATES PATENTS

| | | | |
|---|---|---|---|
| 2,137,230 | 11/1938 | Arden | 240/10.66 |
| 2,194,992 | 3/1940 | Walsh | 200/60 X |
| 3,176,092 | 3/1965 | Lukasek | 200/155 R X |
| 3,375,381 | 3/1968 | Tavel | 310/81 |

Primary Examiner—J. D. Miller
Assistant Examiner—Robert J. Hickey
Attorney—Edward R. Lowndes

[57] ABSTRACT

A portable battery powered implement embodying a novel floating arrangement of dry cell batteries in the implement casing, together with a rotary switch plate which is movable between "off" and "on" positions for completing a circuit through the batteries and load. Each time the switch plate is moved to its on position a shift of battery position takes place so as to establish fresh metal to metal contact areas in the circuit and thus avoid contact deterioration. The switch plate constitutes an end wall for the casing and novel means are provided for effecting its removal and replacement for battery substitution purposes.

7 Claims, 10 Drawing Figures

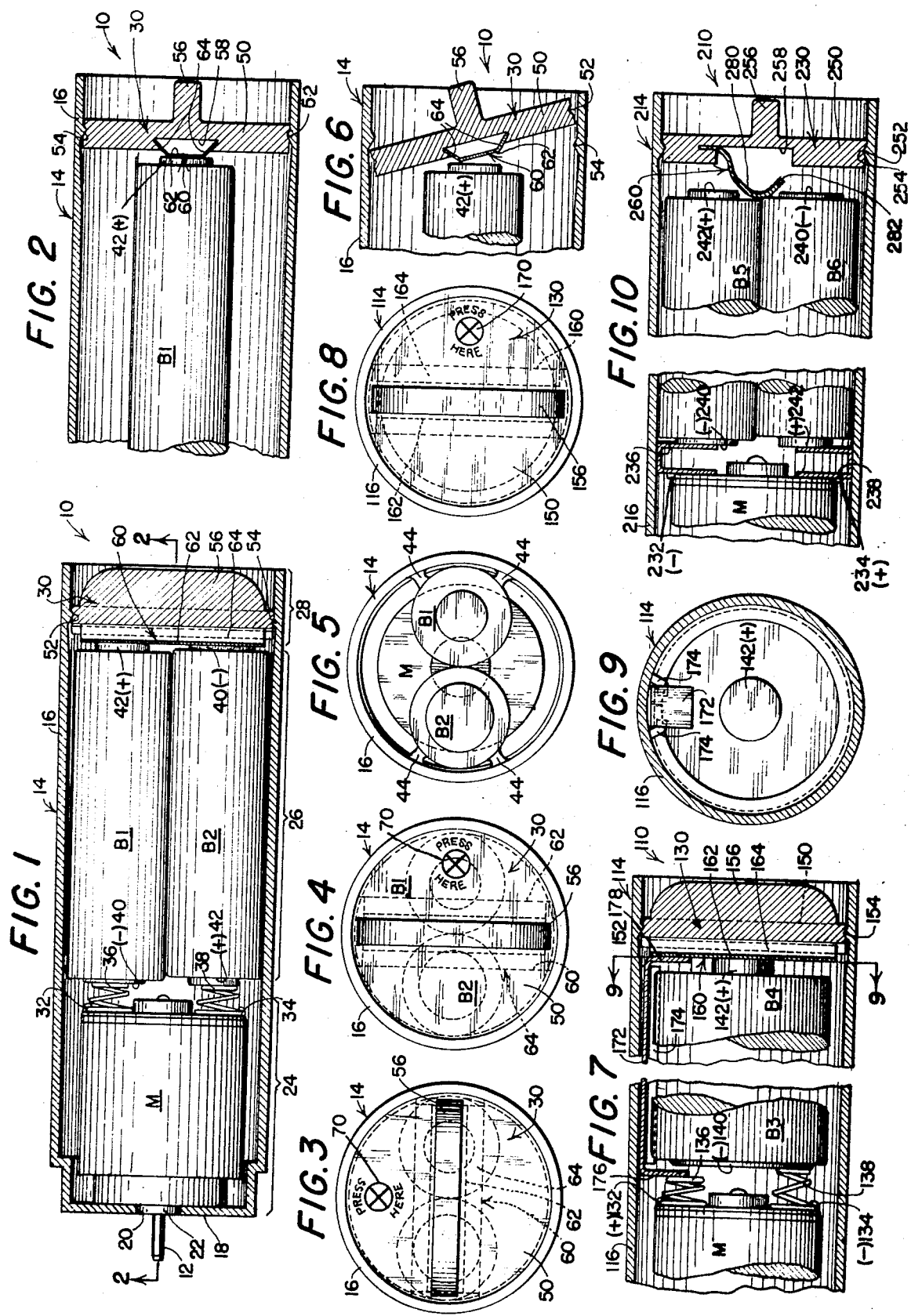

BATTERY POWERED IMPLEMENT AND CIRCUIT CONTROL THEREFOR

The present invention relates to battery powered implements and has particular reference to a novel arrangement of a casing structure for such an implement, the casing serving to enclose the battery pack by means of which the implement is powered and also embodying a novel manually operable circuit making and breaking switch of the off-on variety. The invention is specifically concerned with small portable implements such as electric shavers, nose clippers, manicure implements and a wide variety of similar battery powered tools of the type in which a battery-operated electric motor serves to drive a rotary output shaft on which the tool proper is mounted or to which it is operatively connected in driven relationship. Irrespective however of the particular use to which the invention may be put, the essential features thereof remain substantially the same.

Heretofore, considerable difficulty has been encountered in connection with the mounting of a dry cell battery pack consisting of cylindrical batteries of the D C or AA one and one-half volt type in the cylindrical battery compartment of a portable tool casing while at the same time providing a reliable off-on switch which will function efficiently and repeatedly each time it is manipulated. Failure to establish the desired electric circuit through the motor or other electrical load, where tools of the character under consideration are concerned, is not always a result of switch failure. More often than not, it is a result of faulty battery connections to the switch, to the motor, or to one another.

With few exceptions, battery pack casing for small portable power tools which are regarded as novelty items rather than precision instruments employ a floating battery arrangement wherein the cylindrical batteries are spring biased bodily in their longitudinal direction in order to establish conductive pressure points between the adjacent ends or terminals of tandem-arranged batteries, and also to establish good electrical contact between the battery pack and the load. Interposed in the electrical circuit and physically mounted on the casing is an off-on circuit making and breaking switch of the sliding contact type. The functioning of such a switch is entirely independent of the spring pressure which is employed for biasing the batteries, such pressure remaining constant whether the switch be in its on or its off position. Although failure of this switch to energize the load when it is moved to its on position is usually attributed to a faulty switch, the trouble, more often than not, resides in faulty contacts at other points in the circuit. Shaking or jarring of the tool will occasionally correct the trouble, at least temporarily.

The present invention is designed to overcome the above-noted limitations that are attendant upon the construction and use of conventional battery powered motorized implements and, toward this end, the invention contemplates the provision of a novel battery mounting and off-on switch arrangement wherein a rotary switch plate which constitutes an end closure for the battery compartment of the cylindrical tool casing carries a bridging contact bar which, in its on position electrically bridges the adjacent contact terminals of a pair of side-by-side dry cell batteries so as to establish a series connection between such batteries and complete a circuit through the motor. In its off position, the contact bar becomes disconnected from the battery terminals so that the batteries are electrically isolated from each other, thus opening the motor circuit. According to the invention, the batteries which constitute the battery pack are spring biased in the longitudinal direction of the casing toward the combined switch plate and end closure for the battery compartment and the contact bar which is carried by such switch plate, in moving toward its bridging on position, exerts a camming action on the batteries, thus displacing them against the action of their biasing springs so as to increase the spring pressure and thereby insure good electrical contact between the battery terminals and the biasing springs. By such an arrangement any loss in spring biasing pressure which may take place over a period of time, or any corrosion, either electrolytic or otherwise, which may exhibit itself at the pressure terminals between the batteries and the springs, is compensated for by the increased pressure on the batteries which takes place at such time as the battery-bridging bar moves to its bridging or on position. Stated otherwise, with conventional battery powered tools of the type under consideration the spring biasing pressure on the batteries remains constant so that after a period of time moisture arising from conditions of humidity or otherwise may set up an electrolytic action which impairs good electrical contact at the various contact points of the electrical circuit, the present bridging bar makes wiping contact with the associated battery terminals and also physically displaces the batteries in a direction tending to increase the spring biasing pressure thereon, thus forcing the springs repeatedly against the battery terminals so that they may find fresh metal surfaces on which to seat whereby shaking or jarring of the tool is seldom necessary to complete a defective electrical circuit.

The provision of a battery powered implement having a battery mounting and switch arrangement such as has briefly been outlined above constitutes the principal object of the present invention. A further and important object resides in the provision of a novel means whereby battery substitution or replacement may conveniently and quickly be effected by finger pressure against an eccentric point on the switch plate which, as set forth above, constitutes an end closure for the battery compartment. Such pressure on the switch plate serves to displace the same angularly and withdraw the same from the bearing surface of the tool casing which normally surrounds it, thereby releasing the same so that the normal biasing pressure of the springs will dislodge the switch plate and project the batteries at least partially from the battery compartment so that they may conveniently be manually withdrawn for purposes of battery substitution.

A still further object of the invention is to provide a novel combination switch plate and end closure member which is capable of use in connection with battery compartments which enclose battery packs of either the side-by-side or end-to-end tandem battery arrangements, the switch plate, in either instance, performing its circuit making and breaking functions in substantially the same manner, as well as being similarly removable from the tool casing for battery substitution purposes.

The provision of a battery compartment and switch arrangement for portable tools which is extremely simple in its construction and which therefore may be manufactured at a low cost; one in which the tool casing and switch plate may conveniently be constructed from non-conductive plastic material by conventional molding operations, thereby further resulting in economy of manufacture; one in which the side wall of the tool casing is devoid of radially projecting switch buttons, slides or other protrusions which are susceptible to inadvertent displacement and consequent circuit-closing operations; one which is possessed of relatively few component parts, particularly moving parts and which therefore is unlikely to get out of order; one which is rugged and durable and which therefore will withstand rough usage; and one which otherwise is well adapted to perform the services required of it are further desirable features which have been borne in mind in the production and development of the present invention.

Numerous other objects and advantages of the invention, not at this time enumerated, will become readily apparent as the nature of the invention is better understood.

In the accompanying single sheet of drawings forming a part of this specification, several illustrative embodiments of the invention have been shown.

In these drawings;

FIG. 1 is a longitudinal sectional view taken substantially centrally through a battery powered, motor driven implement constructed according to the principles of the present invention and with the switch plate in its on position;

FIG. 2 is a sectional view taken on the line 2—2 of FIG. 1;

FIG. 3 is a rear end view of the structure shown in FIG. 1;

FIG. 4 is a rear end view similar to FIG. 3 but showing the switch plate in its off position;

FIG. 5 is a rear end view of the structure shown in FIG. 1 but with the switch plate removed;

FIG. 6 is a fragmentary longitudinal sectional view taken substantially centrally through the rear end region of the implement and illustrating the manner in which the switch plate may be removed from the casing for battery substitution purposes;

FIG. 7 is a fragmentary longitudinal sectional view, similar to FIG. 1, showing a slightly modified form of the invention wherein the switch plate is used in connection with a tandem battery pack;

FIG. 8 is a rear end view of the structure shown in FIG. 7;

FIG. 9 is a transverse sectional view taken on the line 9—9 of FIG. 7; and

FIG. 10 is a fragmentary sectional view, similar to FIG. 1, showing a further modified form of switch plate capable of use in connection with the invention.

Referring now to the drawings in detail and in particular to FIGS. 1 to 5 inclusive, a battery powered implement embodying the invention is designated in its entirety at 10, the implement being of the rotary motor driven type wherein a rotary tool (not shown) for performing useful work is either mounted directly on or drivingly connected to the output shaft 12 of a conventional electric motor M. The motor is adapted to be powered by one or more batteries which comprise a power pack. These batteries may be of the conventional cylindrical dry cell carbon zinc, alkaline, mercury or nickel cadmium type which are widely afailable in varying sizes, the most common sizes being commercially designated as D, C and AA or penlite. In the form of the invention illustrated in FIGS. 1 to 5 inclusive, it will be considered that the batteries employed in the power pack are one and one-half volt size AA batteries, there being two such batteries in the pack and these batteries being designated respectively at B1 and B2. The motor M and battery pack B1, B2 are disposed in longitudinal alignment in a tool casing 14 which preferably, but not necessarily, is formed by a suitable molding operation from a plastic material such as polypropylene which possesses a limited amount of resiliency so that it returns to its original form when forces tending to deform it are relieved. The tool casing 14 is generally of cylindrical configuration and is provided with an outer wall or shell 16, the forward end of which is closed by a front end wall 18 having a central opening 20 therein for retaining a shaft bearing 22 through which the motor shaft 12 projects, the forward end face of the motor M fitting flush with the end wall 18.

The disposition of the motor M in the forward region of the casing 14 and of the battery pack B1, B2 immediately rearwardly of the motor establishes a forward battery section which is indicated by the bracket 24 in FIG. 1, and an intermediate section similarly indicated by the bracket 26. A third and relatively short switch section 28 is located adjacent the rear end of the casing 14 and contains a rotary switch plate 30 which constitutes one of the principal features of the present invention and the nature and function of which will be described presently. The switch plate 30, in effect, constitutes an end closure for the tubular casing and it is removable for purposes of gaining access to the interior of the casing for battery replacement purposes in a manner that will be made clear subsequently.

The motor shaft 12 projects forwardly of the casing end wall 18 for convenient reception thereon of a suitable work-performing tool such as a rotary cutter such as is employed in connection with a dry shaver, a nose clipper or the like, or it may receive thereon a fingernail filing or other abrasive manicuring disk. On the rear end face of the motor M there project outwardly the usual solder terminals 32 and 34 to which connections leading to the motor brushes of the motor are made. According to the present invention, a pair of helical springs 36 and 38 of tapered design have their large bases soldered to these terminals 32 and 34 respectively, the axes of the springs extending in parallelism and the springs projecting rearwardly toward the battery section 26.

As previously stated, the cylindrical batteries B1 and B2 which are disposed in the battery section 26 of the casing 14 may be conventional dry cell carbon-zinc batteries and it is a characteristic of such batteries that the circular bases thereof present relatively large diameter areas of exposed metal, such areas constituting the negative battery terminals. The opposite circular end faces of such a battery usually is covered with dielectric material but at the central region thereof there is exposed a forwardly projecting post-like projection which constitutes the positive battery terminal. Accordingly, in FIG. 1, the negative terminals of the batteries B1 and B2 are each designated by the reference numeral 40, while the positive terminals are designated by the numeral 42.

As best seen in FIGS. 1 and 5, the two batteries B1 and B2 are disposed in side-by-side relationship for convenient negative-to-positive connection by means of the switch plate 30 and for electrical seating of the negative terminal 40 of the battery B1 on the spring 36 and of the positive terminal 42 of the battery B2 on the spring 34, such seating serving to establish electrical connection of the motor M to the battery pack. The batteries B1 and B2 are held in position within the casing 14 against circumferential shifting by means of opposed pairs of ribs 44 which are formed internally of the cylindrical wall 16. The batteries are however capable of limited axial shifting in the longitudinal direction of the casing, the two springs 34 and 36 serving to bias them rearwardly in the casing 14 with their rearmost positions being determined by reason of the switch plate 30 against which they are at all times urged under the influence of spring pressure.

It is obvious that with the forward positive terminal 42 of the battery B2 and the forward negative terminal 40 of the battery B1 operatively and electrically connected to the motor M through the media of the springs 34 and 46, it is merely necessary to bridge the rear terminals of the two batteries in order to complete and electrical circuit through the motor M. It is the function of the rotary switch plate 30 to perform this function at will. Accordingly, and as clearly shown in FIGS. 1 and 2, the switch plate 30 is in the form of a molded plastic member having a circular disk-like body portion 50 of appreciable thickness and the diameter of which is substantially equal to the inside diameter of the tubular casing 14. The periphery of the body portion (which hereinafter will be referred to simply as a disk) is formed with a continuous shallow annular groove 52 therearound, this groove being designed for cooperation with a continuous annular rib 54 which is provided internally of the wall of the casing 14 near the rear open rim of the latter. When the switch plate 30 is operatively installed in the casing 14, the rib 54 projects into and substantially fills the groove 52 but a certain amount of looseness is preserved so that the switch plate 30 may be freely and manually rotated in either direction while at the same time being held against axial shifting within the casing. The disk 50 thus constitutes an end wall closure for the casing 14. In order to facilitate such manual rotation of the disk, a finger grip rib 56 is integrally formed on the rear side of the latter and extends diametrically thereacross.

The forward side of the circular disk 50 is formed with a diametric groove 58 (FIG. 2) within which there seats a metallic conductive contact-bridging bar 60. This bar is of shallow U-shape in transverse cross section and it includes a flat contact base 62 and a pair of diverging side wings 64. The outer edges of the wings 64 are adapted to frictionally seat within the bottom corners of the grooves 58 and their slant height is such that they serve to maintain the flat contact base 62 a slight distance forwardly of the plane of the front end face of the disk 50.

The contact bar 60 thus extends diametrically across the front face of the disk 50 and the switch plate is adapted to be rotated throughout increments of 90° in either direction between a position wherein the bridging contact base 62 of the bar 60 rests upon and makes electrical contact with the positive terminal 42 of the battery B1 and the negative terminal 40 of the battery B2 as shown in FIGS. 1, 2 and 3, and a position wherein the contact bar 60 is withdrawn from such battery terminals as shown in FIG. 4. It is to be noted at this point that when the switch plate 30 is in its off position as shown in FIG. 4, the springs 36 and 38 at the juncture region between the motor section 24 and the battery section 26 yieldingly urge the two batteries B1 and B2 forwardly so that the peripheral regions of both batteries bear against the contact bar 60 while the adjacent positive and negative terminals of the batteries are disengaged from the bar so as to interrupt the motor circuit. In this forward position of the batteries, the extreme rear ends thereof will lie a slight distance rearwardly of the transverse plane of the flat contact base 62 and, as a consequence, the pressure of the springs 36 and 38 will be materially relieved. Then, at such time as the switch plate 30 is rotated through an angle of 90° to its on position, the sloping side wings 64 of the bar 60 will engage the two adjacent battery terminals 40 and 42 and, by a camming action, force the batteries rearwardly a small distance until such time as the contact base 62 of the bar comes to rest on such terminals and establishes an electrical bridge thereacross. This change in spring pressure creates a limited amount of spring movement so that, unlike springs that make permanent static contact with the battery terminals, the spring movement causes the contact points of the springs to seek fresh metallic seating points on the battery terminals.

As schematically illustrated in FIG. 6, access to the interior of the casing 14 for purposes of battery replacement may be had by removing the switch plate 30 from the casing. This is accomplished by tilting the switch plate throughout a small angle by applying finger pressure against the plate at an eccentric point near the periphery of the plate. As shown in FIGS. 3 and 4, an indicia mark such as is shown at 70 may be printed or otherwise inscribed on the outside surface of the disk 50 at a suitable peripheral region and when finger pressure is applied to such region the disk will be progressively stripped from the annular rib 54 in the manner indicated in FIG. 6, the resilient plastic material of the casing, of the disk, or both yielding to the pressure. After the full annular frictional bond between the disk and the casing has been thus relieved except at the two diametrically disposed contact areas of the disk, pulling of the switch plate from the casing 1 is a comparatively easy matter. Replacement of the switch plate 30 in its operative position within the casing is accomplished by a substantial reversal of the removal operations, the final seating of the disk 50 in its home position being accomplished by exerting a pulling action on the finger grip rib 56.

In the modified form of the invention shown in FIGS. 7, 8 and 9, the battery powered implement 110 is similar in many respects to the previously described battery powered implement 10 of FIG. 1, the principal difference residing in the fact that the casing 114 and switch plate 130 are designed to accommodate a battery pack which consists of one or more dry cell batteries, two such batteries B3 and B4 being disclosed for exemplary purposes and being arranged in end-to-end tandem relationship so that the negative terminal 140 of the battery B3 is presented toward the motor M2, while the positive terminal 142 of the battery B4 is presented toward the switch plate 130. In view of the similarity between the implements 10 and 110, and in order to avoid needless repetition of description, similar reference numerals but of a higher order have been applied to the corresponding parts as between the disclosures of FIGS. 1 and 7.

Since only the positive terminal 142 of the battery B4 is presented to the switch plate 130 it is necessary that a shunt bar such as the bar 172 be provided to transmit current from the contact spring 136 to a region adjacent the bridging contact bar 160 where it may be made available to such bar 172 when the latter is moved to its on position. This shunt bar is mounted for limited sliding movement on the inside face of the tubular casing 14 by means of integral lugs 174 (FIG. 9) which capture the bar but allow for axial shifting thereof. The forward end of the shunt bar 172 is turned laterally inwardly as indicated at 176 and this inturned end lies forwardly of the contact terminal 140 of the battery B3 but does not engage the same. Such inturned end 176 makes electrical contact with the spring 136, the spring serving yieldingly to bias the shunt bar 172 forwardly within the casing 14. The rear end of the shunt bar 172 is also turned laterally as indicated at 178 and lies rearwardly of the front end face of the battery B4 and in the path of swinging movement of the bridging contact bar 160 on the switch plate 130. Such switch plate and contact bar may be substantially identical with the switch plate 30 and contact bar 60 and the switch plate is similarly removably mounted for rotation about the central axis of the casing 114 between off and on positions.

Whereas in the implement 10 the bridging contact bar 50, in the on position of the switch plate 30, serves to electrically connect the adjacent negative and positive terminals of a pair of side-by-side batteries by a direct diametric bridging action, in the implement 110 the contact bar 160 serves to bridge the positive terminal 142 of the battery B4 and the laterally turned end 178 of the shiftable shunt bar 172 by a radial bridging action, thus completing the electric circuit through the motor M2. In the off position of the switch plate 130, the contact bar 160 remains in contact with the positive terminal 142 of the battery B4 but, because it has been shifted through an angle of 90°, it no longer remains in contact with the inturned end 178 of the shunt bar 172 and thus the motor circuit is open. With the bridging contact bar 150 no longer in the path of movement of the shunt bar 172, the expansive force of the spring 136 serves to shift such shunt bar to its extreme rearward position wherein the laterally turned end 178 thereof engages the non-conducting disk portion 150 of the switch plate 130. At such time as the switch plate is rotated so as to cause the same to assume its on position, the shunt bar 172 will be engaged by one of the diverging side wings 164 of the contact bar 160 and, by a camming action thereagainst, caused to shift forwardly in the casing 114, thereby increasing the pressure in the spring 136 in the same manner and for the same purpose as set forth in connection with the shifting movement of the batteries B1 and B2 associated with the implement 10.

In FIG. 10 a still further form of the invention is disclosed. In this view the implement casing 214 remains substantially the same as the implement casing 14 so that it will accommodate a battery pack consisting of batteries B5 and B6 which are disposed in side-by-side relationship. The switch plate however is of a modified construction in that the bridging contact bar 260 associated therewith supplies the necessary spring pressure to bias the batteries forwardly within the casing 214 and against a pair of substantially rigid contact pieces 236 and 238 which are soldered to the terminals 132 and 134 of the motor M3. Again, due to similarity between the implement 10 of FIG. 1 and the implement 110 of FIG. 10, similar reference numerals but of a still higher order have been applied to the corresponding parts as between the disclosures of these two views.

The switch plate 230 of the implement 210 is similar to the switch plate 30 and it is similarly provided with a manipulating rib 256 and diametric groove 258. However, the bridging contact bar 260, instead of being rigid, is formed of spring steel and one edge region thereof is embedded in the plastic material of the plate. The bar 260 is substantially coextensive with the groove 258 and the exposed portion of such bar arches across the groove as indicated at 280 and presents a free edge 282. The curvature of the arched portion 280 establishes a cam surface which is designed for camming action with the negative and positive terminals 240 and 242 of the batteries B5 and B6 as the switch plate 230 moves to its on position. This camming action serves to force the batteries B5 and B6 forwardly and establish good electrical contact thereof with the contact pieces 234 and 236. Otherwise the implement 210 remains the same as the implement 10, both as regards its structure and function.

It is to be noted that the forms of the invention shown in FIGS. 1 and 7 respectively both operate upon the same principle of limited longitudinal battery displacement at such times as the switch plate is actuated either to or from its off position. In the case of the implement 10 of FIG. 1, the battery pack consists of at least two batteries disposed in side-by-side relationship so that at both the forward and rear ends of the battery pack, two terminals of opposite polarity are presented. The rear terminals are disposed in the path of movement of the bridging contact bar as it moves toward its on position. In the case of the implement 110 of FIG. 7, the battery pack consists of a single battery, or plural batteries arranged in end-to-end relationsip so that only one terminal is presented to the motor and only one terminal is presented to the switch plate. The shunt bar 172 supplies the necessary second terminal at each end of the battery pack and, therefore this shunt bar may be regarded as a second element of the battery pack which functions as a "battery" of zero voltage and, in the case of the implement 10, either battery B1 or B2 may be regarded as a "shunt bar" with respect to the other battery, such shunt bar contributing an added voltage to the battery pack.

The invention is not to be limited to the exact arrangement of parts shown in the accompanying drawings or described in this specification as various changes in the details of construction may be resorted to without departing from the spirit of the invention. For example, although the invention has been illustrated and described herein connection with a battery powered motorized implement, it is to be distinctly understood that the present floating arrangement of dry cell batteries and rotary switch plate are equally applicable to use in connection with portable flashlights, in which case the motor terminals 32, 34, 132, 134, 234, and 234 will function as lead-in and lead-out terminals for a flashlight bulb or other resistance element. Therefore, only insofar as the invention has particularly been pointed out in the accompanying claims is the same to be limited.

Having thus described my invention, what I claim and desire to secure by letters patent is:

1. In a battery powered implement, in combination, a tubular cylindrical casing defining a forward load-containing section, an intermediate battery section and a rear switch section, a front end wall closing the forward end of the casing, an electric load disposed in said forward section and provided with electrical input and output terminals, a battery pack including a cylindrical battery disposed within said battery section and having its negative end wall terminal facing forwardly and its positive end wall terminal facing rearwardly, a conductive shunt bar disposed alongside said battery within said battery section and presenting a positive end terminal which faces forwardly and a negative end terminal which faces rearwardly, said battery and shunt bar being of substantially the same effective length and being capable of independent shifting movement bodily within the casing, a first conductive compression spring physically and conductively interposed between the negative end wall terminal of said battery and one terminal of the load and serving to yieldingly bias the battery rearwardly within the casing, a second conductive compression spring physically and conductively interposed between the positive end terminal of the shunt bar and the other terminal of the load and serving to yieldingly bias the shunt bar rearwardly within the casing, a nonconductive circular switch plate mounted in said switch section for rotation within the casing about the central longitudinal axis thereof, means normally preventing axial shifting of the switch plate within the casing, the rear end of said battery pack normally and yieldingly bearing against said switch plate under the influence of said compression springs, a bridging contact bar extending diametrically across said switch plate and movable bodily therewith, said switch plate being movable between and off postion wherein at least one of said rearwardly facing terminals is out of contact with said switch bar and an on position wherein both of said rearwardly facing terminals are in contact with said bar, said bridging contact bar being provided with a cam surface thereon which, upon movement of the cam plate to its on position, engages said one terminal and displaces the shunt bar rearwardly against the action of the associated compression springs.

2. In a battery powered implement, the combination set forth in claim 1, wherein said shunt bar is in the form of a second battery and wherein both of said rearwardly facing terminals are out of contact with said contact bar when the switch plate is in its off position.

3. In a battery powered implement, in combination, a tubular cylindrical casing defining a forward motor section, an intermediate battery section and a rear switch section, a front wall closing the forward end of the casing, an electric motor disposed within said motor section, having an output shaft projecting through said end wall and provided with electrical input and output terminals, a battery pack disposed within said battery section and including a pair of cylindrical batteries disposed in substantially contiguous side-by-side and reversed relationship so that each end of the pack presents adjacent negative and positive end terminals which lie in approximately the same transverse plane, a non-conductive circular switch plate mounted in said switch section for rotation about the central axis of the casing, means for preventing axial shifting of the switch plate relative to the casing, a pair of compression spring interposed between the forward end of the battery pack and the motor and electrically connecting the adjacent battery terminals and the motor terminals respectively, each spring serving to yieldingly bias one of said batteries rearwardly in the casing and against said switch plate, a narrow conductive bridging contact bar extending diametrically across said switch plate and movable bodily therewith, said switch plate being movable between an off position wherein the contact bar is out of contact with the rear end terminals of the battery pack, and an on position wherein such end terminals bear against the opposite end regions of said bridging contact bar, the effective plane of said contact bar being disposed a slight distance forwardly of the effective plane of said switch plate whereby, upon movement of the switch plate to its on position, said batteries become displaced forwardly against the yielding action of said compression springs.

4. In a battery powered implement, the combination set forth in claim 3, wherein, when the switch plate is in its off position, said contact bar rests upon adjacent non-conductive peripheral areas of said batteries.

5. In a battery powered implement, the combination set forth in claim 4, wherein said casing is formed of a resilient molded plastic material and the means for preventing axial shifting of the switch plate comprises a sliding releasable tongue and groove connection between the periphery of the circular switch plate and the cylindrical wall of the casing, said tongue and groove connection being capable of release when a predetermined degree of forward thrust is imparted to the switch plate at a region adjacent its periphery.

6. In a battery powered implement, the combination set forth in claim 5, wherein said contact bar is provided with slanting side surfaces designed for camming engagement with the end terminals at the rear of the battery pack for forward battery displacement purposes at such time as the switch plate closely approaches its on position.

7. In a battery powered implement, the combination set forth in claim 6, wherein the batteries of said battery pack are in tangential contact with each other, as well as with the cylindrical wall of the casing, and the latter is formed with inwardly extending ribs for preventing revolution of the battery pack within the casing incident to rotation of said switch plate.

* * * * *